United States Patent [19]

Nagahori et al.

[11] Patent Number: 5,896,213

[45] Date of Patent: Apr. 20, 1999

[54] OPTICAL FIBER NETWORK SYSTEM

[75] Inventors: Takeshi Nagahori; Shuntaro Yamazaki, both of Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/616,585

[22] Filed: Mar. 15, 1996

[30] Foreign Application Priority Data

Mar. 17, 1995 [JP] Japan .................................. 7-059282

[51] Int. Cl.$^6$ .................................................. H04J 14/08
[52] U.S. Cl. .............................. 359/137; 359/173; 385/24
[58] Field of Search .................................. 359/125, 121, 359/127, 137, 133, 163, 167–168, 173; 385/24, 46

[56] References Cited

U.S. PATENT DOCUMENTS

| 5,398,129 | 3/1995 | Reimann ................................. 359/137 |
| 5,568,576 | 10/1996 | Takai et al. ............................. 385/24 |
| 5,572,349 | 11/1996 | Hale et al. ............................. 359/167 |

FOREIGN PATENT DOCUMENTS

| 0436820 | 7/1991 | European Pat. Off. . |
| 4233581 | 4/1994 | European Pat. Off. . |
| 60-221710 | 6/1985 | Japan . |
| 0659168 | 4/1994 | Japan . |
| WO9222151 | 12/1992 | WIPO . |

OTHER PUBLICATIONS

J. Abiven et al., "From ISDN to ATM:Fibre in The Loop, an Evolving Scenario", 5th Conference on Optical/Hybrid Access Networks, Lecture No. 6.03, pp. 6.03.01–6.03.06.

M. Kawabata et al., "Capacity enlargement in a low–speed PON system by using multi–rate burst transmission", 6th International Workshop on Optical Access Networks, Lecture No. 2.4, pp. 2.4–1 to 2.4–5.

Y. Motegi et al., "Optical Interconnection to Modules Utilizing Fiber–Optic Parallel Transmission to Enhance Information Throughput", Hitachi Review, vol. 43, No. 2, 1994, pp. 79–81.

Primary Examiner—Kinfe-Michael Negash
Attorney, Agent, or Firm—Sughrue, Mion, Zinn, Macpeak & Seas, PLLC

[57] ABSTRACT

Disclosed is an optical fiber network system which has optical transmitter-receivers disposed in optical network units(ONUs) of number N, an optical transmitter-receiver in a central office which is connected with the ONUs through a passive splitter to form one-to-N star connection, wherein multiplexing is conducted such that a downstream signal from the central office to the ONUs is treated by time division multiplexing(TDM) and a upstream signal from the ONUs to the central office is treated by time division multiple access(TDMA), characterized in that: the passive splitter is replaced by a multi-channel/single-channel conversion cable for interfacing between an array optical fiber with cores of number M and singlecore optical fibers of number M; the optical transmitter-receiver in the central office is replaced by an array optical transmitter and an array optical receiver; and the array optical transmitter and the array optical receiver are connected with the multi-channel/single-channel conversion cable through an array optical fiber cable.

5 Claims, 5 Drawing Sheets

OPTICAL FIBER NETWORK SYSTEM

FIELD OF THE INVENTION

This invention relates to an optical fiber network system, and more particularly to, an optical fiber network system in which the optical fiber network employs star-type topology.

BACKGROUND OF THE INVENTION

As an optical subscriber transmission system which economically provides a narrow-band service such as a telephone, a passive optical network(PON) system has been proposed and developed. The PON system has, as shown in FIG. 1, a passive double star(PDS) composition in which a one-to-N optical transmission system between a central office 1 and optical network units(ONU)11 to 1N of number N performs distribution/multiplexing through a passive splitter 3. The user multiplexing is performed such that a downstream signal is treated by time division multiplexing (TDM) and a upstream signal is treated by time division multiple access(TDMA). Thus, the optical transmission line between the central office 1 and the splitter 3 and an optical transmitter-receiver 2 in the central office 1 are shared by ONUs 11 to 1N of number N to economize.

Since the PON system is directed to the narrow-band service such as a telephone, to apply it to a broad-band service such as video or movie, it should have an increased transmission capacity while utilizing the existing optical transmission line and optical transmitter-receiver as much as possible.

In the conventional method for increasing the transmission capacity while utilizing the existing equipment, using wavelength division multiplexing(WDM) and enhancing the degree of TDM are proposed. One way of providing WDM and enhanced TDM is, as shown in FIG. 2, that a wavelength not used for the narrow-band service is assigned to each ONU or each service by using the high-density wavelength multiplexing technique another way is that a high clock rate burst for the broad-band service is transmitted mixed with a low clock rate burst. For example, this is reported in the 5th Conference on Optical/Hybrid Access Networks, lecture No. 6.03 and the 6th International Workshop on Optical Access Networks, lecture No. 2.4. In FIG. 2, the PON system comprises the central office 1 and ONUs 11 to 1N connected thereto by the optical transmission lines 51 to 5N, wherein the central office 1 comprises the single core type optical transmitter-receivers 71 and 72, the passive splitter 3, the wavelength multiplexing and demultiplexing circuit 7 connecting each of the optical transmitter-receivers 71 and 72 to the passive splitter 3, and the optical transmitter-receiver 2, and ONU 11 comprises the optical transmitter-receiver 31 and the optical transmitter-receiver 41 having a function of wavelength multiplexing.

On the other hand, in the PON system for the narrow-band service, an example that the splitter is disposed in the central office has also been proposed. In this case, without the relaying of a transmission line, ONUs of number N and optical transmitter-receivers of number N in the central office are, as shown in FIG. 3, connected one-to-one, respectively, to form a single star topology. Therefore, the transmission capacity of each ONU can be increased. In FIG. 3, the PON system comprises the central office 1 and ONUs 11 to 1N connected thereto by the optical transmission lines 51 to 5N, respectively, wherein the central office 1 comprises optical transmitter-receivers 21 to 2N, and ONU 11 to 1N comprise the optical transmitter-receivers 31 to 3N, respectively.

However, in the conventional optical fiber network system, to add WDM to the existing PON system to provide the broad-band service, an expensive light source for WDM and an expensive wavelength selecting device as well as the temperature control therefor, which needs a large consumed power, are required. Namely, as compared with the case of originally laying the single star topology, the conventional optical fiber network system with WDM needs more expensive and larger central office equipment and ONUs.

Furthermore, in the case of using the high-speed burst mixed with the low-speed burst, a burst mode compatible receiver which has a reception sensitivity worse than that of a receiver for a continuous signal needs to be sped up. Therefore, it is very difficult for the receiver to get a practical reception sensitivity.

In the case of shifting to the single star topology, it is impossible for the total number of optical transmitter-receivers of numbers required in PON to be accommodated in the central office device designed for PON when utilizing the single star topology.

SUMMARY OF THE INVENTION

Accordingly, it is an object of the invention to provide an optical fiber network system which can increase the transmission capacity economically and without mounting size.

According to the invention, an optical fiber network system comprises optical transmitter-receivers disposed in optical network units(ONUs) of number N, an optical transmitter-receiver in a central office which is connected with the ONUs through a passive splitter to form one-to-N star connection, wherein multiplexing is conducted such that a downstream signal from the central office to the ONUs is treated by time division multiplexing(TDM) and a upstream signal from the ONUs to the central office is treated by time division multiple access(TDMA), characterized in that:

the passive splitter is replaced by a multi-channel/single channel conversion cable for interfacing between an array optical fiber with cores of number M and singlecore optical fibers of number M;

the optical transmitter-receiver in the central office is replaced by an array optical transmitter and an array optical receiver; and the array optical transmitter and the array optical receiver are connected with the multi-channel/single-channel conversion cable through an array optical fiber cable.

In accordance with the invention, without adding a new function to the existing optical transmitter-receiver in each ONU, the broad-band service can be economically provided. The expensive device such as wavelength multiplexer and high-speed and high-sensitivity burst optical receiver is not needed.

Furthermore, since the array optical transmitter-receiver replaces the optical transmitter-receiver disposed in the central office, the increase in the mounting size can be suppressed, i.e., providing a size similar to that of the conventional one channel optical transmitter-receiver in the central office.

On the other hand, the existing high-output optical transmitter-receivers for PON system are left in the ONUs and are connected one-to-one with the array optical receiver disposed in the central office without through traveling the passive splitter which thereby alleviating large branch loss. Therefore, high sensitivity in the array optical receiver disposed in the central office is not required. Thus, the design can be directed to the resistance against electromagnetic-interference rather than the noise, thereby

3 reducing the affect of electrical crosstalk that may be questioned in an array optical receiver.

BRIEF DESCRIPTION OF THE DRAWINGS

The invention will be explained in more detail in conjunction with the appended drawings, wherein.

DESCRIPTION OF THE PREFERRED EMBODIMENTS

Figure 2:
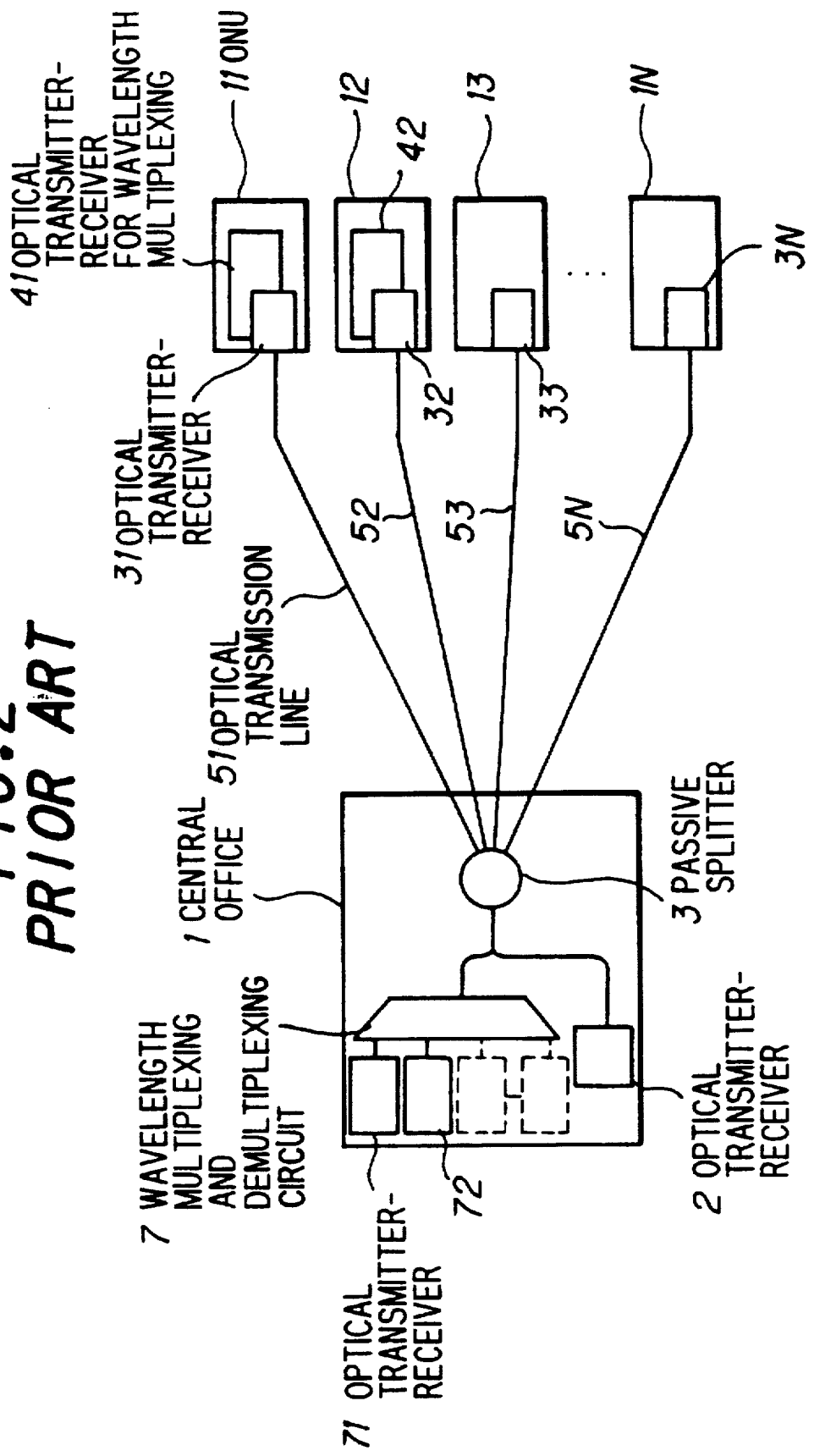
FIG. 2 is a block diagram showing a conventional PON system provided with broad-band by applying the WDM technique.
Figure 3:
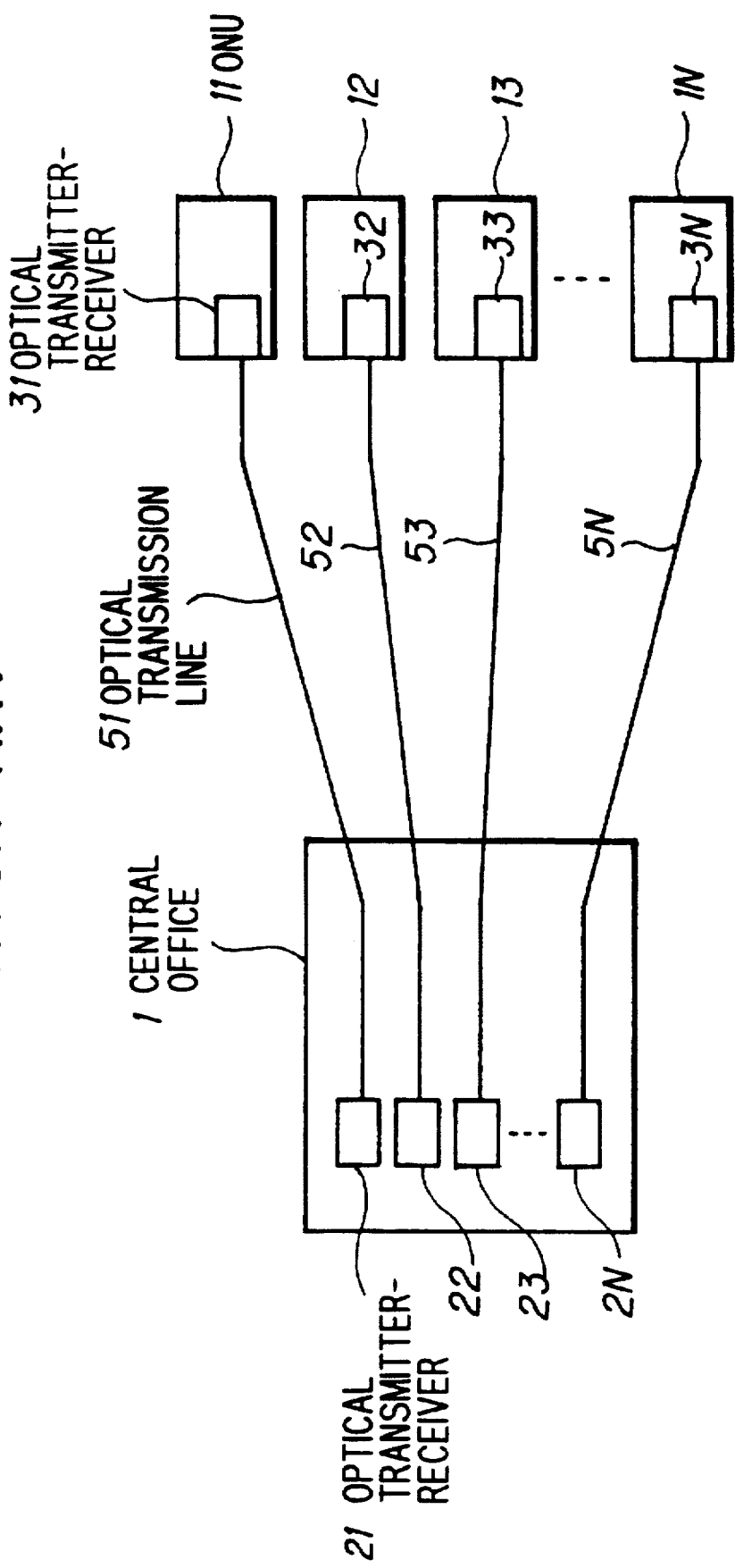
FIG. 3 is a block diagram showing a conventional single star type optical subscriber transmission system.
Figure 4:
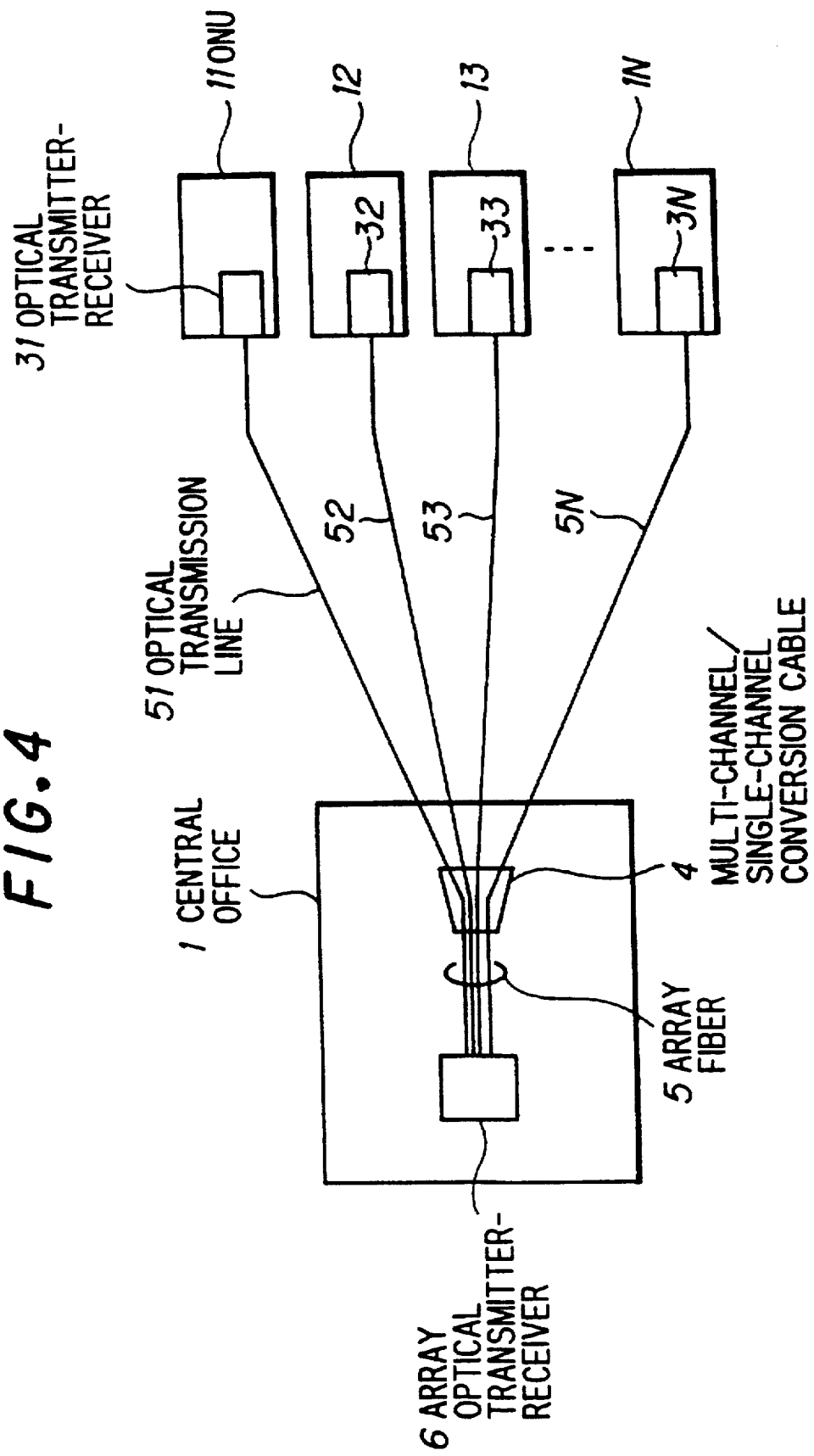
FIG. 4 is a block diagram showing an optical fiber network system in a preferred embodiment according to the invention.
Figure 5:
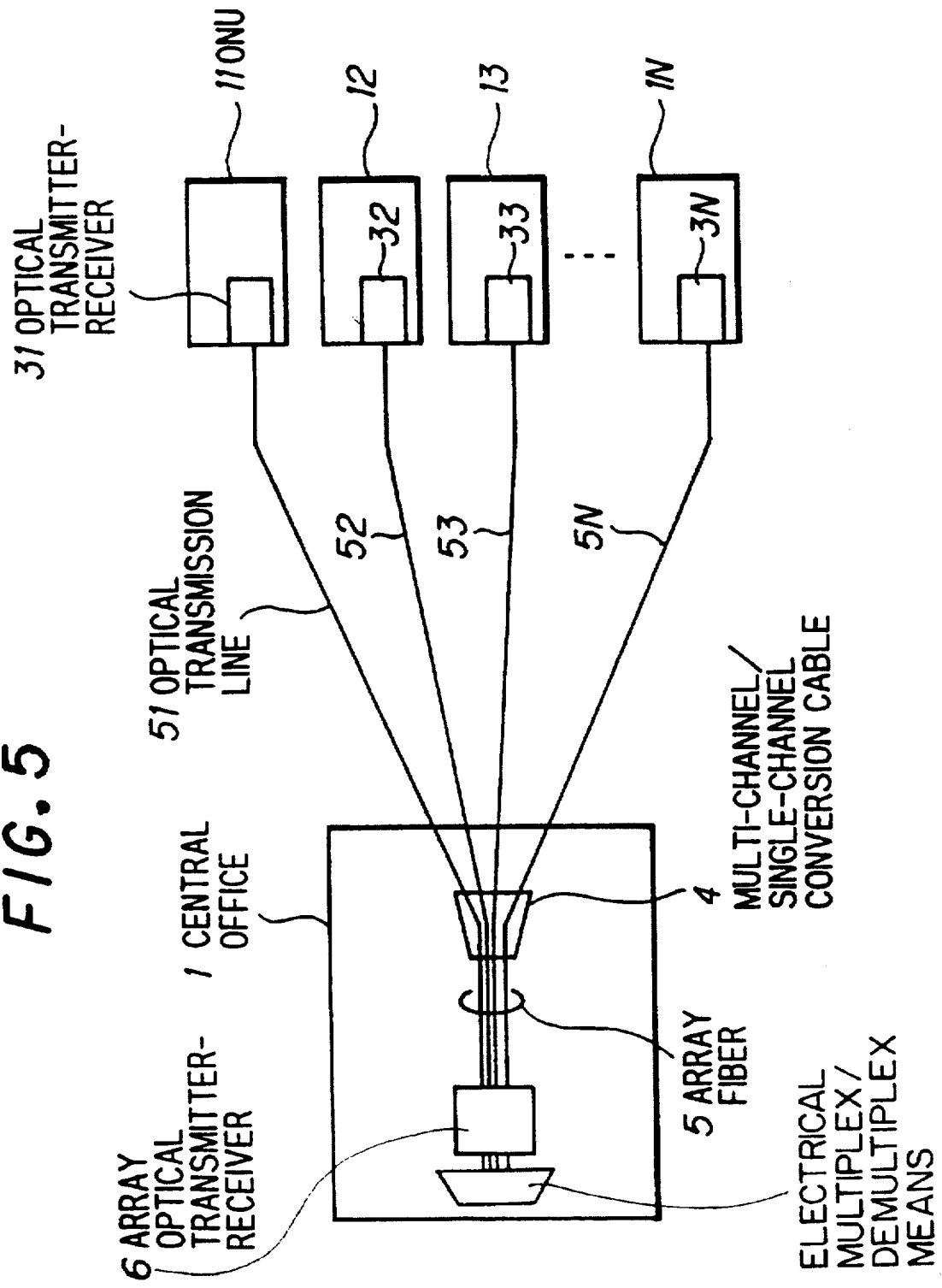
FIG. 5 is a block diagram showing an optical fiber network system in another preferred embodiment according to the invention.

An optical fiber network system in the preferred embodiment will be explained in FIG. 4, wherein like parts are indicated by like reference numerals as used in FIGS. 1 to 3. Herein, FIG. 1 shows the existing PON system which is to be partially replaced to form the optical fiber network system in the preferred embodiment according to the invention.

Figure 1:
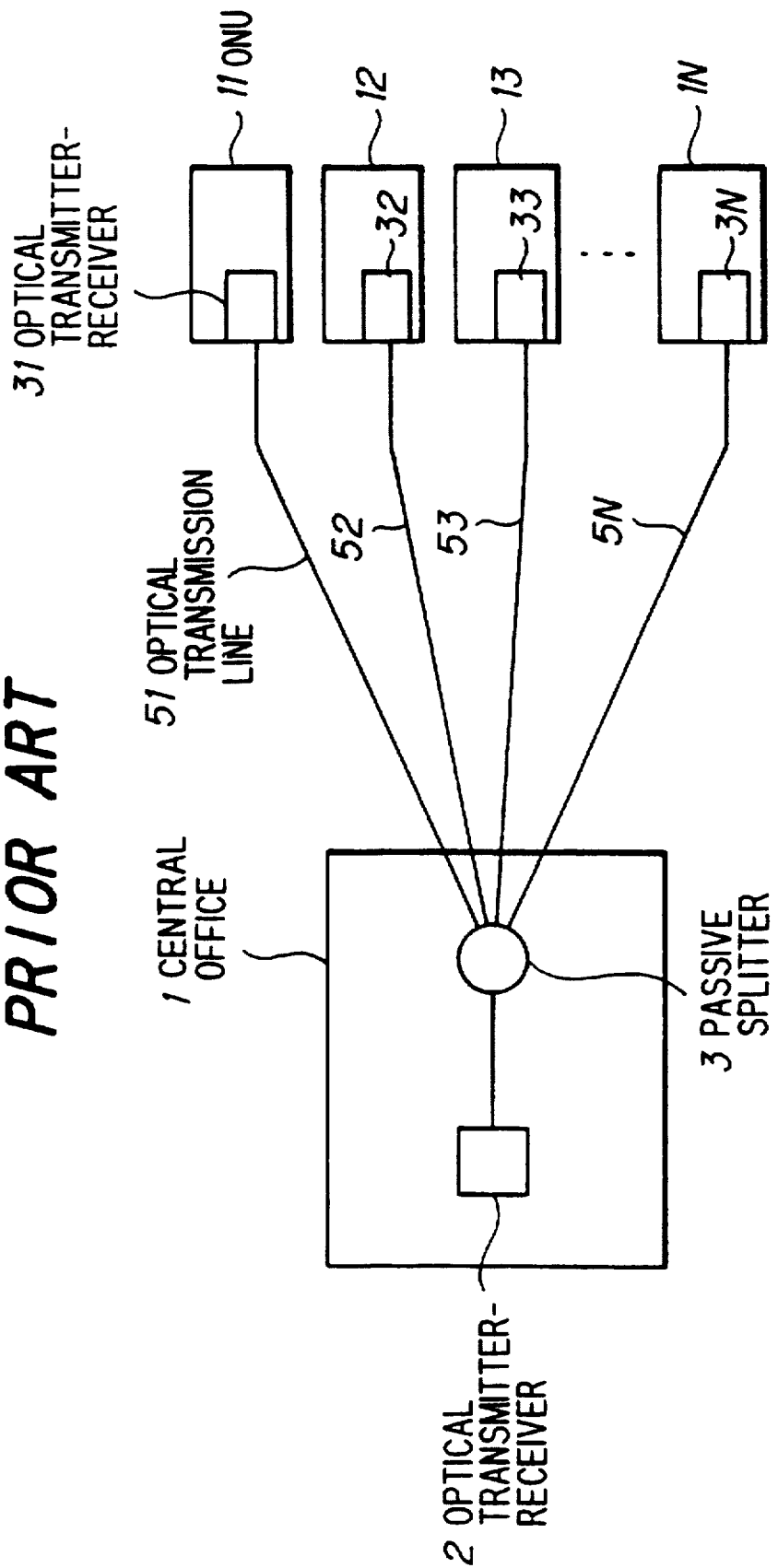
FIG. 1 is a block diagram showing a conventional PON system.

Now, in the conventional PON system in FIG. 1, the passive splitter 3 is disposed in the central office 1 and ONUs 11 and 12 need the supply of broad-band service. Then, as shown in FIG. 4, the burst mode compatible transmitter-receiver 2 is replaced by an array optical transmitter-receiver 6 and the passive splitter 3 is replaced by a multi-channel/single-channel conversion cable 4 and the array optical transmitter-receiver 6 is connected to the multi-channel/single-channel conversion cable by array fibers 5. Each channel of the array optical transmitter-receiver 6 can thereby be connected one-to-one with each of ONUs. This is equivalent to that in the single star topology in FIG. 3 where the optical transmitters 21 to 2N in the central office 1 are connected one-to-one with the optical transmitter-receivers 31 to 3N in ONUs 11 to 1N.

Thus, without requiring the exchange or addition of new functions to the existing optical transmitter-receivers 31 to 3N in ONU 11 to 1N and the existing optical transmission lines 51 to 5N, the transmission capacity can be made N times the branching number of the passive splitter 3 to provide the broad-band service.

Here, the array optical transmitter-receiver can be provided in a size similar to that of a one channel optical transmitter-receiver, by making an array light emitting device and an array optical transmission LSI into a module and making an array photodetector and an array optical receiver LSI into a module. Hitachi Review, vol. 43, p. 79 (1994) reports an example of a 10-channel 200 Mbps optical transmitter/optical receiver is integrated in a 1 cc package. Thus, the increase in the mounting size will be suppressed by replacing the existing optical transmitter-receiver 2 of the PON in the central office 1 with the array optical transmitter-receiver 6.

The array optical transmitter-receiver 6 disposed in the central office 1 may have a problem of electrical crosstalk between channels in the receiver section. It is known that the crosstalk is mainly caused by a power source line or a space connection between channels in the array photodetector. The former cause can be removed by suitable separation and filtering of the power source. To remove the latter cause, it is effective to reduce the input impedance of the optical receiving circuit for amplifying an optical current output from the array photodetector however, the reduction of input resistance and the reduction of noise in the optical receiving circuit can not simultaneously be achieved. For example, in a transimpedance amplifier used as the optical receiving circuit, when the input impedance is reduced while keeping constant the voltage gain, the value of feedback resistance needs to be reduced, thereby increasing the thermal noise.

However, in the optical fiber network system of the invention, a high light-receiving level can be obtained at the array optical receiver in the central office 1 while not necessitating the reduction of noise in the receiving circuit since the existing high output optical receiver for PON is used in ONUs 11 to 1N and the branch insertion loss by the passive splitter does not exist.

Accordingly, the receiving circuit with a low input impedance which hardly cause the crosstalk can be easily designed.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A method for providing distribution/multiplexing in an optical fiber network system comprising:

providing N number of optical network units (ONUs) each including an optical transmitter-receiver, coupling a central office to said ONUs and providing an optical transmission-reception means in said central office to form one-to-N star connections, performing time division multiplexing (TDM) on a downstream signal propagating from said central office to said ONUs and performing time division multiple access (TDMA) on an upstream signal propagating from said ONUs to said central office, wherein the improvement comprises:

coupling said central office with said ONUs by a multi-channel/single-channel conversion cable that interfaces between an optical fiber array with M number of cores and M number of single-core optical fibers;

providing, as said optical transmission-reception means, an optical transmitter array and an optical receiver array; and connecting said optical transmitter array and said optical receiver array with said multi-channel/single-channel conversion cable through an optical fiber array cable.

2. A method of providing an optical fiber network system, according to claim 1, wherein the method step of providing, as said optical transmission-reception means, an optical transmitter array and an optical receiver array, provides said optical transmitter array comprising a module integrating a plurality of optical transmitters and said optical receiver array comprising a module integrating a plurality of optical receivers.

3. An optical fiber network system comprising:

a plurality of optical transmitter-receivers disposed in N number of optical network units (ONUs);

an optical transmitter array and an optical receiver array contained in a central office; and a multi-channel/single-channel conversion cable connected to said optical transmitter array and said optical receiver array, and coupled with said ONUs to form one-to-N star connections with said ONUs, wherein a downstream signal propagating from said central office to said ONUs is time division multiplexed (TDM) and an upstream signal propagating from said ONUs to said central office is accessed using time division multiple access (TDMA).

4. An optical fiber network system comprising:

a plurality of optical network units each comprising an optical transmitter-receiver providing a channel for transmitting and receiving optical signals;

a central office comprising an array optical transmitter-receiver providing a plurality of channels for transmitting and receiving optical signals; and a plurality of optical transmission lines for connecting said optical transmitter-receiver in each of said plurality of optical network units to said central office;

said central office comprising:

an array fiber comprising a plurality of optical fibers; and a multi-channel/single-channel conversion cable comprising a channel interval-unchanging portion and a channel interval-changing portion;

each channel of said plurality of channels provided by said array optical transmitter-receiver being connected one-to-one with each of said plurality of optical fibers of said array fiber, said each of said plurality of optical fibers of said array fiber being connected one-to-one with each channel of said channel interval-unchanging portion of said multi-channel/single-channel conversion cable, each channel of said channel interval-changing portion of said multi-channel/single-channel conversion cable being connected one-to-one with each of said plurality of said transmission lines, and said each of said plurality of said transmission lines being connected one-to-one with said optical transmitter-receiver in each of said plurality of optical network units.

5. An optical fiber network system according to claim 4, wherein:

said array optical transmitter-receiver is composed of a module comprising an array light emitting device and an array optical transmitter, and a module comprising an array photodetector and an array optical receiver.

* * * * *